(12) United States Patent
Shinohara et al.

(10) Patent No.: US 7,728,071 B2
(45) Date of Patent: Jun. 1, 2010

(54) GEAR FOR ELECTRIC POWER STEERING DEVICE

(75) Inventors: Kenichi Shinohara, Tochigi (JP); Takanori Kurokawa, Osaka (JP); Hirokazu Arai, Nara (JP)

(73) Assignees: E. I. Du Pont De Nemours and Company, Wilmington, DE (US); JTEKT Corporation, Osaka (JP)

( * ) Notice: Subject to any disclaimer, the term of this patent is extended or adjusted under 35 U.S.C. 154(b) by 253 days.

(21) Appl. No.: 11/433,336

(22) Filed: May 12, 2006

(65) Prior Publication Data

US 2007/0265392 A1 Nov. 15, 2007

(51) Int. Cl.
*C08L 77/00* (2006.01)
*C08L 51/04* (2006.01)

(52) U.S. Cl. .......................... 525/66; 525/68
(58) Field of Classification Search .................. 525/66, 525/68
See application file for complete search history.

(56) References Cited

U.S. PATENT DOCUMENTS

| | | | |
|---|---|---|---|
| 2,941,956 A | | 6/1960 | Bergstrom |
| 4,128,599 A | | 12/1978 | Thomas et al. |
| 4,346,194 A | | 8/1982 | Roura |
| 4,861,828 A | * | 8/1989 | Waggoner .................... 525/66 |
| 5,360,888 A | | 11/1994 | Ullrich |
| 5,750,620 A | * | 5/1998 | Davies et al. ................. 525/67 |
| 5,912,315 A | * | 6/1999 | Horiie ......................... 528/71 |
| 6,451,890 B1 | | 9/2002 | Imashiro et al. |

| | | |
|---|---|---|
| 2004/0010094 A1 | 1/2004 | Shinohara et al. |
| 2005/0204341 A1 | 9/2005 | Broussard |

FOREIGN PATENT DOCUMENTS

| | | |
|---|---|---|
| EP | 1 186 512 A2 | 3/2002 |
| EP | 1 959 004 | 8/2008 |
| JP | 9-194719 | 7/1997 |
| JP | 09-328609 | 12/1997 |
| JP | 11-343408 | 12/1999 |
| WO | WO 96/06890 | 3/1996 |
| WO | WO2006/124659 A1 | 11/2006 |

OTHER PUBLICATIONS

Motai et al., electronic translation of the specification of JP 09-194719 (Jul. 1997).*
Campbell et al., "High Polymers Containing the Carbodiimide Repeat Unit", Journal of Organic Chemistry, vol. 28, pp. 2069-2075 (1963).
PCT International Search Report and Written Opinion for International Application No. PCT/US2006/018525 dated Feb. 2, 2007.
EPO Communication Pursuant to Article 94(3) EPC, Appln. No. 06 844 441.3-21-1.
Official communication in corresponding EP application, EP06770299.3.

* cited by examiner

*Primary Examiner*—Jeffrey C Mullis
(74) *Attorney, Agent, or Firm*—Loretta Smith; Arne Järnholm

(57) ABSTRACT

A gear for an electric power steering device for reducing the rotation speed of an electric motor for steering assist with a reduction gear mechanism and transmitting the rotation to a steering mechanism, the gear being incorporated and used in the reduction gear mechanism, wherein at least the teeth of the gear are formed from a resin composition of a non-reinforced type comprising (a) a polyamide resin having a carboxyl group at least at a terminal end; (b) 0.5-5 wt. % a polycarbodiimide compound, and (c) 3-15 wt. % an elastic material modified with a reactive functional group.

4 Claims, 4 Drawing Sheets

GEAR FOR ELECTRIC POWER STEERING DEVICE

FIELD OF THE INVENTION

The present invention relates to polyamide resin composition. More particularly, the present invention relates to a polyamide resin composition comprising impact modifier, polycarbodiimide, and optionally phenol-formaldehyde resin. The polyamide compositions have good impact resistance and stiffness.

The composition of the present invention is preferable for a gear for an electric power steering device that is used for reducing the rotation speed and augmenting the power output of an electric motor in an electric power steering device for an automobile.

BACKGROUND OF THE INVENTION

Polyamide compositions are used in a wide variety of applications because of their excellent physical properties, chemical resistance, and processability. Common applications include automotive parts and electrical and electronic parts. Though polyamides have good inherent toughness, low-elasticity rubber impact modifiers are often used to increase the toughness of polyamide compositions. However, the addition of these impact modifiers can reduce the stiffness of the resulting resin. Stiffness can be improved by the addition of reinforcing agents and fillers, particularly inorganic reinforcing agents (for example, glass fibers) and mineral fillers, but this measure can lead to further problems with wear on processing equipment, anisotropy, increased melt viscosities, and decreased hydrolysis resistance. Hence, a polyamide composition containing impact modifiers that has good stiffness without the need to add additional reinforcing agents and fillers would be desirable.

The following disclosures may be relevant to various aspects of the present invention and may be briefly summarized as follows:

It is known that impact strength can be markedly improved by adding an elastomeric material modified with reactive functional groups to polyamide resins. For example, a toughened polyamide blend is disclosed in U.S. Pat. No. 4,346,194, which contains a) 60 to 97 weight percent polyamide (a mixture of 66 nylon and 6 nylon) and b) 3 to 40 weight percent of a polymeric toughening agent selected from (i) an elastomeric olefin copolymer with carboxyl or carboxylate functionality or (ii) an ionic copolymer of at least one α-olefin and at least one α,β-unsaturated carboxylic acid, which can contain a ternary copolymerizable monomer, and which is at least partially ionized by neutralizing its acidic ingredients with a metallic basic salt.

Polyamide compositions have been disclosed in which melt viscosity and resistance to hydrolysis have been improved by the addition of polycarbodiimides. For example, a polycarbodiimide modified tractable polyamide product is disclosed in U.S. Pat. No. 4,128,599 with unique rheological properties and improved shear properties. It is disclosed that the polycarbodiimide functions as a bridging agent in which the carbodiimide group bridges the terminal COOH and the $NH_2$ group in the polyamide.

U.S. Pat. No. 5,360,888 discloses a polyamide resin composition containing 0.1 to 5 weight aromatic polycarbodiimide that is stabilized to hydrolysis at high temperatures.

US patent application publication 2004/0010094 discloses a polyamide resin composition comprising aromatic or aliphatic polycarbodiimides in a ratio of 0.10 to 3.5 molar equivalents of carbodiimide groups to acid end groups in the polyamide.

The application of polyamide composition includes automotive parts as described above. In column-type electric power steering devices, for example, a small gear such as a worm and a large gear such as a worm wheel are used as a reduction gear mechanism and, after the rotation speed of an electric motor has been reduced and the power output has been augmented by transmission from the small gear to the large gear, the rotation is applied to a steering shaft, thereby torque assisting the steering operation. In electric power steering devices used in lightweight four-wheel automobiles or in the usual passenger vehicles, in particular comparatively small-size passenger vehicles, the so-called resin gears have been generally used for at least one gear of the small gear and large gear, in particular for the large gear, in which at least the teeth thereof are made from a resin instead of the conventional metal, with the object of reducing the noise level by decreasing the tooth impact noise in the reduction gear mechanism, decreasing the weight, and reducing the sliding resistance.

More specifically, resin gears having a composite structure of an annular metal core that is coupled to a steering shaft so as to enable the integral rotation therewith and an annular gear body made from a resin, having teeth on the outer periphery thereof, and formed so as to surround the outer periphery of the core have been widely used as large gears for gear reduction mechanisms of electric power steering devices. Furthermore, polyamide resins such as, for example, MC (monomer casting) Nylon, Polyamide 6, Polyamide 66, and Polyamide 46 have been generally used as the base resins for forming the gear body. In recent years, the possibility of using resin gears as large gears for reduction gear mechanisms also in electric power steering devices of larger automobiles has been more studied compared to before. Furthermore, a demand has been recently created for electric power steering devices that are smaller in size and weight than the conventional devices, regardless of the automobile size, with the object of producing automobiles with better fuel efficiency that cause less environmental pollution.

However, the problem associated with such conventional resin gears is that when they are incorporated in electric power steering devices of large automobiles or electric power steering devices reduced in size to decrease fuel consumption, the required endurance performance cannot be sufficiently ensured and the gears are fractured within a comparatively short interval. This is because the power output of the electric motor has to be increased and the torque transmitted to the reduction gear mechanism increases as the automobile becomes larger in size. Furthermore, as the size of the electric power steering device is reduced, it becomes difficult to take such measures as increasing the module and decreasing the surface pressure in large gears, and the surface pressure transmitted from small gears to large gears tends to increase. Presently, the conventional resin gears are unable to meet fully the requirement to increase the power output of reduction gear mechanisms.

Accordingly, it is desirable to provide resin gears with both the high rigidity corresponding to a transition to a higher power output of reduction gear mechanisms, in particular, the rigidity necessary to maintain a high strength in a high-temperature environment in which the electric power steering devices are used, and the high toughness preventing the resin gear from fracturing easily under applied stresses. It is well known that the rigidity of resin compositions can be increased by blending reinforcing fibers such as glass fibers with a polyamide resin serving as a base resin. However, the resultant problem is that the toughness of the resin composition decreases significantly. Yet another problem is that the resin gears formed from such resin compositions have the so-called attack ability and the teeth of the metal gears assembled therewith are easily damaged or worn. Moreover, the fine metal powder (wear powder) produced from the damaged and worn-out metal gears easily cut or damage the teeth themselves. For this reason, resin compositions of a non-reinforced type that contain no reinforcing fibers are preferred for forming resin gears. Various research have been conducted to improve properties of non-reinforced resin compositions.

For example, it is known that the toughness of a resin composition can be increased by blending an elastic material with a polyamide resin serving as a base resin. However, because the rigidity is decreased, the resin gear formed by using such resin composition can be easily deformed. The resultant problem is that, for example, when the resin gear is used as a large gear, and a torque is applied by the rotation of an electric motor via a small gear, the large gear deforms, the transmission ratio of the torque from the small gear is reduced or the rotation is delayed and the engagement with the small gear is easily degraded. Yet another problem is that, in addition to susceptibility of such resin gears to instantaneous deformation, a creep deformation also can easily occur therein, and the creep deformation easily decreases dimensional stability and causes fluctuations of backlash in engagement with the small gears.

It is also known that increasing the molecular weight of polyamide resins can increase the toughness, while preventing the rigidity from decreasing. However, for example, when various additives are blended with a polyamide resin and a molding material (pellets, etc.) for injection molding is manufactured after kneading in a state where the resin is heated to a temperature equal to or higher than the melting point of the polyamide resin and melted, or when a resin gear is produced by heating again the manufactured molding material to a temperature equal to or higher than the melting point thereof and melting in a cylinder of an injection molding apparatus and then injecting the resin into a metal mold linked to the injection molding apparatus, for example, into a shaped cavity corresponding to the shape of the gear body in the case of resin gears of a complex structure, the decomposition of the polyamide resin is enhanced and the molecular weight thereof decreases under the effect of moisture adsorbed by the polyamide resin and heat during melting. The resultant problem is that even if a polyamide resin with an increased molecular weight is used, the toughness of the resin gear manufactured by the above-described process cannot be increased.

It is known that various properties of resin compositions can be improved by blending a polycarbodiimide compound with a polyamide resin. For example, Japanese Patent Application Laid-open No. H6-16933 (claim 1, paragraph No. 0001, 0004-0007) describes that if a polymer aromatic polycarbodiimide is blended at a ratio of 0.1 to 5 wt. % with a polyamide resin, then stability of the resin composition against hydrolysis, in particular, in acidic media can be improved. Furthermore, Japanese Patent Application Laid-open No. H9-194719 (claim 1, paragraph No. 0005-0008, 0031, 0062) describes that if 1-300 parts by weight of at least one elastic material selected from the group including a polyamide elastomer, a polyester elastomer, an acrylic rubber, a silicone rubber, and a fluorine-containing rubber, a modified polyolefin rubber, and a modified rubber is blended with a total of 100 parts by weight of 30 to 99 wt. % a thermoplastic resin such as a polyamide resin and 70 to 1 wt. % polycarbodiimide, then heat resistance and impact resistance of the resin composition can be improved. Furthermore, Japanese Patent Application Laid-open No. H11-343408 (claim 1, paragraph No. 0002-0003, 0006-0007, 0012-0014) describes that if an aliphatic carbodiimide compound is blended with a polyamide resin, then stability of the resin composition against hydrolysis, oil resistance, and resistance to metal halides can be increased.

SUMMARY OF THE INVENTION

Briefly stated, and in accordance with one aspect of the present invention, there is provided a gear for an electric power steering device for reducing the rotation speed of an electric motor for steering assist with a reduction gear mechanism and transmitting the rotation to a steering mechanism, the gear being incorporated and used in the reduction gear mechanism, wherein at least the teeth of the gear are formed from a resin composition of a non-reinforced type comprising:

(a) a polyamide resin having a carboxyl group at least at a terminal end;

(b) 0.5-5 wt. % a polycarbodiimide compound, and (c) 3-15 wt. % an elastic material modified with a reactive functional group.

DETAILED DESCRIPTION OF THE INVENTION

Figure 1:
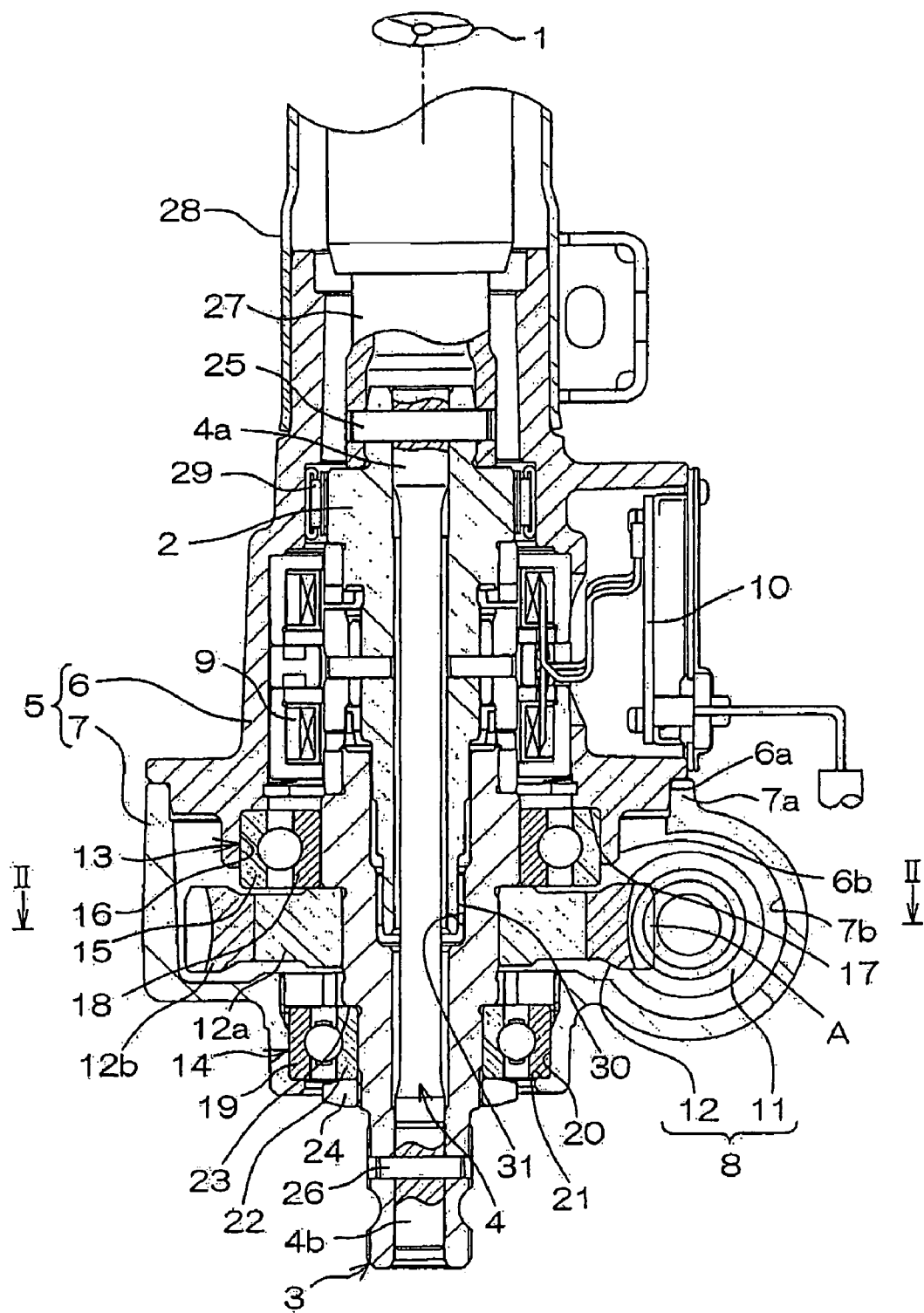
FIG. 1 is a schematic cross-sectional view illustrating an example of an electric power steering device having a reduction gear mechanism incorporating the gear for an electric power steering device in accordance with the present invention.

The compositions of the present invention comprise polyamide, impact modifier, polycarbodiimide, and optionally, novolac resin.

Polyamide

The polyamide of the composition of the present invention is at least one thermoplastic polyamide. The polyamide may be homopolymer, copolymer, terpolymer or higher order polymer. Blends of two or more polyamides may be used. Suitable polyamides can be condensation products of dicarboxylic acids or their derivatives and diamines, and/or aminocarboxylic acids, and/or ring-opening polymerization products of lactams. Suitable dicarboxylic acids include, adipic acid, azelaic acid, sebacic acid, dodecanedioic acid, isophthalic acid and terephthalic acid. Suitable diamines include tetramethylenediamine, hexamethylenediamine, octamethylenediamine, nonamethylenediamine, dodecamethylenediamine, 2-methylpentamethylenediamine, 2-methyloctamethylenediamine, trimethylhexamethylenediamine, bis(p-aminocyclohexyl)methane, m-xylylenediamine, and p-xylylenediamine. A suitable aminocarboxylic acid is 11-aminododecanoic acid. Suitable lactams include caprolactam and laurolactam.

Preferred aliphatic polyamides include polyamide 6; polyamide 66; polyamide 46; polyamide 69; polyamide 610; polyamide 612; polyamide 1010; polyamide 11; polyamide 12; semi-aromatic polyamides such as poly(m-xylylene adipamide) (polyamide MXD6), poly(dodecamethylene terephthalamide) (polyamide 12T), poly(decamethylene terephthalamide) (polyamide 10T), poly(nonamethylene terephthalamide) (polyamide 9T), the polyamide of hexamethylene terephthalamide and hexamethylene adipamide (polyamide 6T/66); the polyamide of hexamethyleneterephthalamide and 2-methylpentamethyleneterephthalamide (polyamide 6T/DT); the polyamide of hexamethylene isophthalamide and hexamethylene adipamide (polyamide 6I/66); the polyamide of hexamethylene terephthalamide, hexamethylene isophthalamide, and hexamethylene adipamide (polyamide 6T/6I/66) and copolymers and mixtures of these polymers.

Examples of suitable aliphatic polyamides include polyamide 66/6 copolymer; polyamide 66/68 copolymer; polyamide 66/610 copolymer; polyamide 66/612 copolymer; polyamide 66/10 copolymer; polyamide 66/12 copolymer; polyamide 6/68 copolymer; polyamide 6/610 copolymer; polyamide 6/612 copolymer; polyamide 6/10 copolymer; polyamide 6/12 copolymer; polyamide 6/66/610 terpolymer; polyamide 6/66/69 terpolymer; polyamide 6/66/11 terpolymer; polyamide 6/66/12 terpolymer; polyamide 6/610/11 terpolymer; polyamide 6/610/12 terpolymer; and polyamide 6/66/PACM (bis-p-{aminocyclohexyl}methane)terpolymer.

A preferred polyamide is polyamide 66. Blends of polyamides with other thermoplastic polymers may be used. The polyamide is present in about 77 to about 96.9 weight percent, or preferably about 83 to about 94.5 weight percent, based on the total weight of the composition.

Impact Modifier

The impact modifier is any impact modifier suitable for toughening polyamide resins. Examples of suitable impact modifiers are given in U.S. Pat. No. 4,174,358, which is hereby incorporated by reference herein. Preferred impact modifiers are carboxyl-substituted polyolefins, which are polyolefins that have carboxylic moieties attached thereto, either on the polyolefin backbone itself or on side chains. By 'carboxylic moiety' is meant carboxylic groups such as one or more of dicarboxylic acids, diesters, dicarboxylic monoesters, acid anhydrides, monocarboxylic acids and esters, and salts. Carboxylic salts are neutralized carboxylic acids. Useful impact modifiers are dicarboxyl-substituted polyolefins, which are polyolefins that have dicarboxylic moieties attached thereto, either on the polyolefin backbone itself or on side chains. By 'dicarboxylic moiety' is meant dicarboxylic groups such as one or more of dicarboxylic acids, diesters, dicarboxylic monoesters, and acid anhydrides. Preferred polyolefins are copolymers of ethylene and one or more additional olefins, wherein the additional olefins are hydrocarbons.

The impact modifiers will preferably be based an olefin copolymer, such as an ethylene/α-olefin polyolefin. Examples of olefins suitable for preparing the olefin copolymer include alkenes having 2 to 8 carbon atoms, such as ethylene, propylene, 1-butene, 1-heptene, or 1-hexene. Diene monomers such as 1,4-hexadiene, 2,5-norbornadiene, 1,7octadiene, and/or dicyclopentadiene may optionally be used in the preparation of the polyolefin. Preferred olefin copolymers are polymers derived from ethylene, at least one α-olefin having 3 to 6 carbon atoms, and at least one unconjugated diene. Particularly preferred polyolefins are ethylene-propylene-diene (EPDM) polymers made from 1,4-hexadiene and/or dicyclopentadiene and ethylene/propylene copolymers.

The carboxyl moiety may be introduced to the olefin copolymer to form the impact modifier during the preparation of the polyolefin by copolymerizing with an unsaturated carboxyl-containing monomer. The carboxyl moiety may also be introduced by grafting the polyolefin with an unsaturated grafting agent containing a carboxyl moiety, such as an acid, ester, diacid, diester, acid ester, or anhydride.

Examples of suitable unsaturated carboxylic-containing comonomers or grafting agents include maleic acid, maleic anhydride, monoester maleate, metal salts of monoethylester maleate, fumaric acid, monoethylester fumarate, itaconic acid, vinylbenzoic acid, vinylphthalic acid, metal salts of monoethylester fumarate, and methyl, propyl, isopropyl, butyl, isobutyl, hexyl, cyclohexyl, octyl, 2-ethylhexyl, decyl, stearyl, methoxyethyl, ethoxyethyl, hydroxy, or ethyl, monoesters and diesters of maleic acid, fumaric acid, or itaconic acid, etc. Maleic anhydride is preferred.

A preferred impact modifier is an EPDM polymer or ethylene/propylene copolymer grafted with maleic anhydride. Blends of polyolefins, such as polyethylene, polypropylene, and EPDM polymers with polyolefins that have been grafted with an unsaturated compound containing a carboxyl moiety may be used as impact modifiers.

Other preferred impact modifiers are ionomers, which are carboxyl-group containing polymers that have been partially neutralized with bivalent metal cations such as zinc, manganese, magnesium, or the like. Preferred ionomers are ethylene/acrylic acid and ethylene/methacrylic acid copolymers that have been partially neutralized with zinc. Ionomers are commercially available under the Surlyn® trademark from E. I. DuPont de Nemours & Co., Inc., Wilmington, Del.

The impact modifier is present in the composition in about 2 to about 20 weight percent, or preferably, about 5 to about 14 weight percent, based on the total weight of the composition.

Polycarbodiimide

The polycarbodiimide can be an aliphatic, alicyclic, or aromatic polycarbodiimide, and may be represented by the following chemical formula:

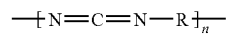

where the R group represents an aliphatic, alicyclic, or aromatic group.

Examples of suitable R groups include, but are not limited to, divalent radicals derived from 2,6-diisopropylbenzene, naphthalene, 3,5-diethyltoluene, 4,4'-methylene-bis(2,6-diethylenephenyl), 4,4'-methylene-bis(2-ethyle-6-methylphehyl), 4,4'-methylene-bis(2,6-diisopropylephenyl), 4,4'-methylene-bis(2-ethyl-5-methylcyclohexyl), 2,4,6-triisopropylephenyl, n-hexane, cyclohexane, dicyclohexylmethane, and methylcyclohexane, and the like.

Polycarbodiimides can be manufactured by a variety of methods known to those skilled in the art. Conventional manufacturing methods are described in U.S. Pat. No. 2,941,956 or Japan Kokoku patent application S47-33279, *J. Org. Chem.*, 28, 2069-2075 (1963), *Chemical Reviews*, 81, 619-621 (1981). Typically, they are manufactured by the condensation reaction accompanying the decarboxylation of organic diisocyanate. This method yields an isocyanate-terminated polycarbodiimide.

Aromatic diisocyanates, aliphatic diisocyanates, and alicyclic diisocyanates, or mixtures thereof, for example, can be used to prepare polycarbodiimides. Suitable examples include 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-trilene diisocyanate, 2,6-trilene diisocyanate, mixtures of 2,4-trilene diisocyanate and 2,6-trilene diisocyanate, hexamethylene diisocyanate, cyclohexane-1,4-diisocyanate, xylylene diisocyanate, isophoron diisocyanate, dicyclohexylmethane-4,4'-diisocyanate, methylcyclohexane diisocyanate, tetramethylxylylene diisocyanate, 2,6-diisopropylephenyl isocyanate, and 1,3,5-triisopropyl benzene-2,4-diisocyanate, and the like.

Chain termination agents can be used to control the polymerization and yield polycarbodiimides having end groups other than isocyanates. Examples suitable chain termination agents include monoisocyanates. Suitable monoisocyanates include phenyl isocyanate, tolyl isocyanate, dimethylphenyl isocyanate, cyclohexyl isocyanate, butyl isocyanate, and naphthyl isocyanate, etc.

Other suitable chain termination agents include alcohols, amines, imines, carboxylic acids, thiols, ethers, and epoxides. Examples include methanol, ethanol, phenols, cyclohexanol, N-methylethanolamine, poly(ethylene glycol) monomethylethers, poly(propylene glycol) monomethylethers, diethylamine, dicyclohexylamine, butylamine, cyclohexylamine, citric acid, benzoic acid, cyclohexanoic acid, ethylene mercaptan, arylmercaptan, and thiophenol.

The reaction of organic diisocyanates to form polycarbodiimides is performed in the presence of a carbodiimidation catalyst such as 1-phenyl-2-phospholene-1-oxide, 3-methyl-1-phenyl-2-phospholene-1-oxide, 1-ethyl-2-phospholene-1-oxide, 3-methyl-e-phospholene-1-oxide, and 3-phospholene isomers of the foregoing. Of these, 3-methyl-1-phenyl-2-phospholene-1-oxide is particularly reactive.

The polycarbodiimide is present in the composition in about 0.1 to about 5 weight percent, or preferably greater than 0.5 to about 3 weight percent, or more preferably greater than 0.5 to about 2 weight percent based on the total weight of the composition.

There may be interactions between the polyamide resin and polycarbodiimide and between the polycarbodiimide and impact modifier in the compositions of the present invention. These interactions can take the form reactions to form covalent bonds between terminal polyamide carboxyl groups and carbodiimide groups in the polycarbodiimide, as well as covalent bonds between the carboxyl moiety of the impact modifier and carbodiimide groups in the polycarbodiimide. The reaction that form any covalent bonds may be reversible in some or all cases. These possible interactions mean that some of all of the polycarbodiimide in the compositions exists bonded to or associated with via non-bonding interactions the polyamide and/or impact modifier. The interactions are believed to contribute to the toughness and stiffness of the compositions of the present invention.

Phenol-Formaldehyde Resin

Thermoplastic phenol-formaldehyde resins, also known as novolac resins, can be represented by the following structure, where each instance of R represents one or more substituents. Each substituent may be selected H, alkyl groups, alicyclic groups, and aryl groups. Each aromatic ring may contain more than one substituent other than H, and all the substituents other than H may be the same or different.

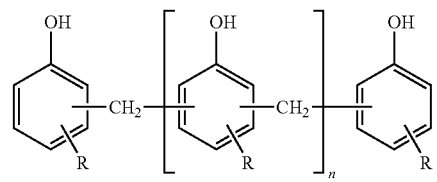

Phenol-formaldehyde resins can be prepared by reacting at least one aldehyde with at least one phenol or substituted phenol in the presence of an acid or other catalyst such that there is a molar excess of the phenol or substituted phenol. Suitable phenols and substituted phenols include phenol, o-cresol, m-cresol, p-cresol, thymol, ethylphenol, propylphenol, p-butylphenol, tert-butylcatechol, pentylphenol, hexylphenol, octaphenol, heptylphenol, nonylphenol, bisphenol-A, hydroxynaphthalene, resorcinol, bisphenol A, isoeugenol, o-methoxy phenol, 4,4'-dihydroxyphenyl-2,2-propane, isoamyl salicylate, benzyl salicylate, methyl salicylate, 2,6-di-tert-butyl-p-cresol, and the like. Suitable aldehydes and aldehyde precursors include formaldehyde, paraformaldehyde, polyoxymethylene, trioxane, and the like. More than one aldehyde and/or phenol may be used in the preparation of the novolac. A blend of two more different phenol-formaldehydes may also be used. Any thermoplastic phenol-formaldehyde that can be used for conventional plastic molding is suitable, although phenol-formaldehydes having a number average molecular weight of between 500 and 1500 may provide minimal warpage and optimal mechanical properties.

Preferred phenol-formaldehydes include phenol-formaldehyde resins, cresol-formaldehyde resins, resorcinol-formaldehyde resins, and butylphenol-formaldehyde resins. When used, the phenol-formaldehyde resin is present in about 0.5 about 10 weight percent, or preferably in about 2 to about 6 weight percent, or more preferably in about 2 to about 5 weight percent, based on the total weight of the composition.

The compositions of the present invention may further comprise other additives such as flame retardants, lubricants, mold-release agents, dyes and pigments, anti oxidants, and inorganic fillers.

In one embodiment of the present invention, the compositions of the present invention do not contain any reinforcing agents, such as inorganic reinforcing agents (including glass and glass fibers) or mineral fillers.

The compositions of the present invention are melt-mixed blends, wherein all of the polymeric components are well-dispersed within each other and all of the non-polymeric ingredients are dispersed in and bound by the polymer matrix, such that the blend forms a unified whole. Any melt-mixing method may be used to combine the polymeric components and non-polymeric ingredients of the present invention.

For example, the polymeric components and non-polymeric ingredients may be added to a melt mixer, such as, for example, a single or twin-screw extruder; a blender; a kneader; or a Banbury mixer, either all at once through a single step addition, or in a stepwise fashion, and then melt-mixed. When adding the polymeric components and non-polymeric ingredients in a stepwise fashion, part of the polymeric components and/or non-polymeric ingredients are first added and melt-mixed with the remaining polymeric components and non-polymeric ingredients being subsequently added and further melt-mixed until a well-mixed composition is obtained.

The compositions of the present invention may be formed into articles using methods known to those skilled in the art, such as, for example, injection molding, blow molding, extrusion, thermoforming, melt casting, vacuum molding, and rotational molding. The composition may be overmolded onto an article made from a different material. The composition may be extruded into films or sheets. The composition may be formed into monofilaments.

The resulting articles may be used in a variety of applications, including housings, automotive parts, electrical goods, electronics components, and construction materials.

The second aspect of the present invention relates to a gear for an electric power steering device that is used for reducing the rotation speed and augmenting the power output of an electric motor in an electric power steering device for an automobile.

The research conducted by the inventors demonstrated that blending a small amount of a polycarbodiimide compound with a polyamide resin not only can improve the above-described various properties, but also can increase the toughness, while preventing the rigidity of the resin gears from decreasing. This is because the apparent viscous resistance of the polyamide resin is increased by the interaction (supposedly the crosslinking caused by the addition reaction) of carboxyl groups which are the terminal functional groups of the polyamide resin and carbodiimide groups present in the polycarbodiimide compound. The viscous resistance as referred to herein is a viscous component in the case the behavior of the resin in a solid state thereof is represented by that of a viscoelastic body. Moreover, this interaction is reversible, and although it is temporarily canceled in the melting process employed to manufacture the pellets or conduct the injection molding, the interaction appears again in the cooling process and the apparent viscous resistance of the polyamide resin increases. As a result, the toughness can be increased, while preventing the rigidity of the resin gear from decreasing when it is manufactured via the above-described process.

However, the interaction only between those two components is still insufficient and the toughness is sometimes still not sufficiently high. For this reason, blending an elastic material that produces an effect of increasing the toughness, as described in Japanese Patent Application Laid-open No. H9-194719, has been studied, but the problem is that blending the elastic material alone decreases the rigidity and facilitates the deformation of the resin gear, as was demonstrated by prior art. Furthermore, when the amount of the polycarbodiimide compound is too high, as in the embodiments of Japanese Patent Application Laid-open No. H9-194719, the excess polycarbodiimide is crosslinked, thereby making it impossible to obtain the effect of increasing the apparent viscous resistance of the polyamide resin. Moreover, the lumps of the crosslinked polycarbodiimide compound appear in the resin composition, thereby degrading the continuity of the resin composition. The resultant problem is that the toughness is greatly decreased.

The second aspect of the present invention provides a gear for an electric power steering device, which as a resin gear that has at least the teeth thereof formed from a non-reinforced resin composition comprising a polyamide resin as the base resin and containing no reinforcing fibers and which has a rigidity and toughness superior to those of the conventional resin gears.

Specifically, the gear for an electric power steering device in accordance with the present invention is a gear for an electric power steering device for reducing the rotation speed of an electric motor for steering assist with a reduction gear mechanism and transmitting the rotation to a steering mechanism, the gear being incorporated and used in the reduction gear mechanism, wherein at least the teeth of the gear are formed from a resin composition of a non-reinforced type comprising:

(a) a polyamide resin having a carboxyl group at least at a terminal end;
(b) 0.5 to 5 wt. % a polycarbodiimide compound, and
(c) 3 to 15 wt. % an elastic material modified with a reactive functional group.

The resin composition preferably further comprises:
(d) 1 to 10 wt. % a thermoplastic phenoxy resin.

Furthermore, it is preferred that the reactive functional group of the elastic material (c) be of at least one type selected from a carboxyl group and a carboxylate group and that the elastic material (c) be an ethylene-propylene-diene copolymer modified with a reactive functional group.

The present invention employs not only the interaction of carboxyl groups that are the terminal functional groups of the polyamide resin with carbodiimide groups present in the polycarbodiimide compound, but also the interaction of reactive functional groups modifying the elastic material with either of the aforementioned groups. Moreover, this interaction is reversible, and although it is temporarily canceled in the melting process employed to manufacture a molding material such as pellets or to conduct the injection molding using the molding material thus manufactured, the interaction appears again in the cooling process. As a result, the apparent viscous resistance of the polyamide resin increases.

In a state where this interaction has occurred, the decrease in rigidity can be effectively inhibited while the action of increasing the toughness by the elastic material is maintained. The reason therefor is not clear, but the following explanation can be provided. When a conventional elastic material, which is not modified with a reactive functional group and, therefore, does not interact with the polyamide resin or polycarbodiimide compound, is blended, the rigidity is apparently decreased due to the reduction in the apparent viscous resistance of the polyamide resin and the enhancement of plastic deformation by the elastic material present in an isolated state inside the resin composition. With the elastic material modified with a reactive functional group, the reverse effect can be assumed.

Furthermore, in accordance with the second aspect of the present invention, because the polycarbodiimide compound is blended at a ratio of 0.5 to 5 wt. % based on the entire resin composition, the crosslinking of the excess polycarbodiimide composition can be prevented. The entire amount thereof interacts with the polyamide resin and elastic material, the apparent viscous resistance of the polyamide resin is increased, and the elastic material can be caused to function so as to behave integrally with the polyamide resin, without being isolated in the resin composition. Therefore, the second aspect of the present invention can provide a gear for an electric power steering device that has both the rigidity and the toughness superior to those of the conventional gears.

Furthermore, because the molecular weight of polyamide resins is easily decreased due to decomposition caused by the adsorbed moisture, as described hereinabove, strict control of the amount of moisture in the resin composition has been required. With the second aspect of the present invention, the advantage is that the strict moisture control is not needed because the apparent viscous resistance can be maintained due to the interaction of the polyamide resin, polycarbodiimide compound, and elastic material.

Thermoplastic phenoxy resins act to inhibit water absorption by polyamide resins. For this reason, when the resin composition for forming the resin for an electric power steering device in accordance with the second aspect of the present invention comprises a thermoplastic phenoxy resin, the size variation of the gear for an electric power steering device caused by water absorption by the polyamide resin is decreased and, for example, the decrease in backlash with the other gear caused by water absorption and swelling and the degradation of engagement caused thereby can be inhibited. Moreover, the thermoplastic phenoxy resin decreases the toughness of the polyamide resin, but because this decease can be compensated by the above-described interaction between the components, the gear for an electric power steering device can maintain a high rigidity and a good toughness even when it comprises the thermoplastic phenoxy resin.

When the reactive functional group of the elastic material is at least one of a carboxyl group and a carboxylate group, it effectively interacts with the carbodiimide group present in the polycarbodiimide compound, thereby further increasing the rigidity and toughness of the gear for an electric power steering device. Furthermore, when the elastic material is an ethylene-propylene-diene copolymer (EPDM) modified with a reactive functional group, because the EPDM has good mutual solubility with the polyamide resin and polycarbodiimide compound, the rigidity and toughness of the gear for an electric power steering device can be further increased. Furthermore, because the EPDM has good resistance to lubricating oils and the like, the endurance of the gear for an electric power steering device can be increased.

In the gear for an electric power steering device in accordance with the present invention, at least the teeth are formed from a resin composition of a non-reinforced type comprising:

(a) a polyamide resin having a carboxyl group at least at a terminal end;

(b) 0.5 to 5 wt. % a polycarbodiimide compound, and (c) 3 to 15 wt. % an elastic material modified with a reactive functional group.

The reason why this resin composition is restricted to a non-reinforced type comprising no reinforcing fibers was described hereinabove. A specific example of the gear for an electric power steering device has a composite structure of a metal core mounted on a steering shaft and an annular gear body formed from the resin composition, having teeth on the outer periphery thereof, and disposed so as to surround the outer periphery of the core.

The gear for an electric power steering device of such composite structure can be manufactured, for example, by an insert molding process in which a core is retained in a retainer of a metal mold having the retainer for retaining the core and a cavity corresponding to the shape of the gear body, the metal mold is linked to an injection molding apparatus, and in this state a resin composition melted in the injection molding apparatus is injected into the mold cavity and then cooled to form the resin body in a state of integration with the core. Because the teeth of the gear body are required to have a high dimensional accuracy, it is preferred that the shape adjustment surface be formed, e.g., as a cylinder that can be formed into teeth by after-processing, rather than in the shape corresponding to the shape of the tooth in the mold cavity used in the above-described process, and that the teeth be formed by after-processing, for example cutting, on the outer peripheral surface of the insert-molded gear body corresponding to the shape adjustment surface.

(Polyamide Resin)

Any of a large variety of the conventional well-known polyamide resins can be used as the polyamide resin (a), but with consideration for forming a gear for an electric power steering device with excellent rigidity and toughness, Polyamide 6, Polyamide 66, Polyamide 12, Polyamide 612, Polyamide 6/66 copolymer, or mixtures thereof can be considered. Among them, Polyamide 66 is preferred. The polyamide resin has to have a carboxyl group at least at a terminal end to enable the interaction with the carbodiimide group of the polycarbodiimide compound. In the polyamide resin from which the carboxyl group was removed by a terminal end treatment, the expected effect cannot be obtained.

(Polycarbodiimide Compound)

Various polycarbodiimide compounds having a repeating unit represented by the following Formula (1) can be used as the polycarbodiimide compound (b).

$$-N=C=N-R1- \quad (1)$$

Examples of R1 in the Formula (1) include a variety of divalent organic groups, but the following groups are especially preferred. The polycarbodiimide compound may be a homopolymer composed of a single repeating unit comprising one of the below-described groups or may be a copolymer composed of repeating units having two or more different groups.

Divalent groups derived from diisopropylbenzene, such as 2,5-diisopropyl-1,3-phenylene, 2,6-diisopropyl-1,3-phenylene, 4,6-diisopropyl-1,3-phenylene, 2,5-diisopropyl-1,4-phenylene, and 2,6-diisopropyl-1,4-phenylene. Divalent groups derived from diethyltoluene, such as 3,5-diethyl-2,4-tolylene, 3,4-diethyl-2,5-tolylene, 3,4-diethyl-2,6-tolylene, 3,5-diethyl-2,6-tolylene, 2,4-diethyl-3,5-tolylene, 2,6-diethyl-3,5-tolylene, 2,4-diethyl-3,6-tolylene, 2,5-diethyl-3,6-tolylene, and 2,3-diethyl-4,6-tolylene.

Divalent groups derived from naphthalene such as 1,3-naphthylene, 1,4-naphthylene, 1,5-naphthylene, and 1,6-naphthylene. Divalent groups derived from cyclohexane, such as 1,3-cyclohexylene and 1,4-cyclohexylene. Divalent groups derived from methylcyclohexane such as 2-methyl-1,3-cyclohexylene, 4-methyl-1,3-cyclohexylene, 5-methyl-1,3-cyclohexylene, and 2-methyl-1,4-cyclohexylene. Divalent groups derived from triisopropylbenzene, such as 2,4,6-triisopropyl-1,3-phenylene, 2,3,5-triisopropyl-1,4-phenylene, and 2,3,4-triisopropyl-1,5-phenylene. Alkylene groups having 1 to 6 carbon atoms, such as hexamethylene.

Divalent groups represented by Formula (2)

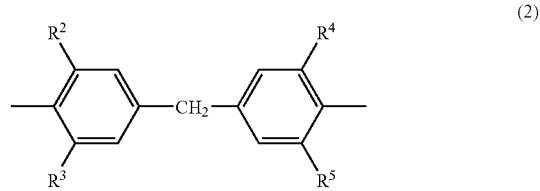

(2)

where R2, R3, R4, and R5, which may be the same or different, stand for an alkyl group having 1 to 3 carbon atoms) such as 4,4'-methylene-bis(2,6-diethylphenyl), 4,4'-methylene-bis(2-ethyl-6-methylphenyl), and 4,4'-methylene-bis(2,6-diisopropylphenyl.

Divalent groups represented by Formula (3)

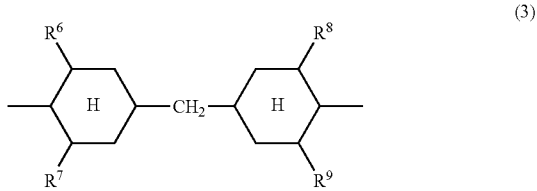

(3)

where R6, R7, R8, and R9, which may be the same or different, stand for a hydrogen atom or an alkyl group having 1 to 3 carbon atoms) such as 4,4'-methylene-bis(cyclohexyl) and 4,4'-methylene-bis(2-ethyl-6-methylcyclohexyl).

The polycarbodiimide compound (b) can be synthesized, for example, by conducting a carbodiimidization reaction of one, two, or more organic diisocyanates comprising two groups of the above-described examples in the presence of a catalyst enhancing the carbodiimidization reaction of isocyanate groups. Examples of suitable catalysts include phospholene oxide compounds and metal catalysts. Examples of phospholene oxide compounds include 1-phenyl-2-phospholene-1-oxide, 3-methyl-1-phenyl-2-phospholene-1-oxide, 1-ethyl-2-phospholene-1-oxide, 3-methyl-2-phospholene-1-oxide, 1-phenyl-3-phospholene-1-oxide, 3-methyl-1-phenyl-3-phospholene-1-oxide, 1-ethyl-3-phospholene-1-oxide, and 3-methyl-3-phospholene-1-oxide.

Examples of metal catalysts include metal carbonyl complexes such as pentacarbonyl iron, nonacarbonyl iron, tetracarbonyl nickel, hexacarbonyl tungsten, and hexacarbonyl chromium, acetylacetone complexes of metals such as beryllium, aluminum, zirconium, chromium, and iron, phosphoric acid esters such as trimethyl phosphate, triethyl phosphate, triisopropyl phosphate, tri-tert-butyl phosphate, and triphenyl phosphate, and tetrabutyl titanate. The degree of polymerization of the polycarbodiimide compound having the repeating unit represented by Formula (1) is preferably controlled during the synthesis in which an organic diisocyanate is subjected to carbodiimidization in the presence of the aforementioned catalyst by blending an alcohol, an amine, or a monoisocyanate to block the end isocyanate groups at an appropriate point in time from the beginning to the end stage of the reaction.

The degree of polymerization of the polycarbodiimide compound (b), that is, the number of repeating units represented by formula (1) is preferably 3 to 10. Furthermore, the molecular weight of the polycarbodiimide compound is preferably 500-3000, as represented by the number-average molecular weight Mn calculated for polystyrene and found by gel permeation chromatography. When the degree of polymerization or molecular weight is below this range, a sufficient effect of increasing the apparent viscous resistance of the polyamide resin might not be obtained even if the interaction with the polyamide resin (a) and elastic material (c) is induced. Conversely, if the degree of polymerization or molecular weight is above this range, the molecules of the polycarbodiimide compound become too large and the interaction with the polyamide resin (a) and elastic material (c) becomes difficult. As a result, in either case, the sufficient effect of increasing the toughness of the gear for an electric power steering device, without decreasing the elasticity thereof, might not be obtained.

The content ratio of the polycarbodiimide compound (b) in the entire resin composition is limited to 0.5 to 5 wt. %. The problem encountered when the content ratio of the polycarbodiimide compound (b) is less than 0.5 wt. % is that the effect of increasing the toughness of the gear for an electric power steering device, without decreasing the elasticity thereof, by the interaction of the polycarbodiimide compound with the polyamide resin (a) and elastic material (c) cannot be obtained. On the other hand, if the content ratio exceeds 5 wt. %, as described hereinabove, the excess polycarbodiimide compound is crosslinked and the effect of increasing the apparent viscous resistance of the polyamide resin cannot be obtained. In addition, lumps of the crosslinked polycarbodiimide compound appear in the resin composition and the continuity of the resin composition is degraded, whereby the toughness is greatly reduced.

Yet another problem is that, because the ratio of the crosslinked polycarbodiimide compound increases and the interaction of the polycarbodiimide compound with the polyamide resin or elastic material becomes too intensive, the melt viscosity becomes too high in the melting process in the course of producing a molding material, such as pellets, from the resin composition or during the injection molding conducted by using the manufactured molding material. In particular, the gear for an electric power steering device cannot be molded effectively and without molding defects in the injection molding process.

Furthermore, from the standpoint of further enhancing the effect of increasing the toughness of the gear for an electric power steering device, without decreasing the elasticity thereof, that is produced by the polycarbodiimide compound (b) and also decreasing the melt viscosity of the resin composition to enable the effective molding of the gear for an electric power steering device, it is preferred that the content ratio of the polycarbodiimide compound (b) in the entire resin composition be 0.5-3.0 wt. %, more specifically 1.5-2.5 wt. % within the above-described range.

(Elastic Material)

Examples of the elastic material (c) include compounds comprising various elastic materials such as rubbers, soft resins, and thermoplastic elastomers as a base skeleton and having the main chain or side chain of the base skeleton modified by various reactive functional groups that can interact with the end carboxyl groups of the polyamide resin (a) or carbodiimide groups contained in the polycarbodiimide compound (b). Furthermore, groups of at least one type selected from carboxyl groups and carboxylate groups (metal salts of carboxyl groups or esters of carboxyl groups and organic groups) that can interact with the carbodiimide groups contained in the polycarbodiimide compound (b) are preferred as the reactive functional groups. When the reactive groups are of at least one type of groups, they can effectively interact with the carbodiimide groups contained in the polycarbodiimide compound and the rigidity and toughness of the gear for an electric power steering device can be further improved.

Olefin copolymers that are the copolymers of at least two olefins (ethylene, propylene, etc.) having 2 to 8 carbon atoms and excel in resistance to lubricating oils and mutual solubility with the polyamide resin (a) or polycarbodiimide compound (b) are preferred as the elastic materials forming the base skeleton. Furthermore, the olefin copolymers can also comprise non-conjugated dienes. Among them, a copolymer of ethylene, an α-olefin having 3 to 6 carbon atoms, and a diene, in particular an ethylene-propylene-diene copolymer is preferred. A compound in which the base skeleton is an ethylene-propylene-diene copolymer and the base skeleton is modified with carboxyl groups by grafting a maleic anhydride is an example of the preferred elastic material satisfying the above-described requirement.

The content ratio of the elastic material (c) in the entire resin composition is limited to 3 to 15 wt. %. When the content ratio of the elastic material (c) is less than 3 wt. %, the effect of increasing the toughness of the gear for an electric power steering device, without decreasing the elasticity thereof, by the interaction of the elastic material with the polyamide resin (a) and polycarbodiimide compound (c) cannot be obtained. Furthermore, if the content ratio exceeds 15 wt. %, the melt viscosity becomes too high in the melting process in the course of producing a molding material, such as pellets, from the resin composition or during the injection molding conducted by using the manufactured molding material. As a result, the gear for an electric power steering device cannot be molded effectively and without molding defects, in particular, in the injection molding process.

Furthermore, from the standpoint of further enhancing the effect of increasing the toughness of the gear for an electric power steering device, without decreasing the elasticity thereof, that is produced by the elastic compound (c) and also decreasing the melt viscosity of the resin composition to enable the effective molding of the gear for an electric power steering device, it is preferred that the content ratio of the elastic compound (c) in the entire resin composition be 5 to 12 wt. %, more specifically 8 to 10 wt. % within the above-described range.

(Thermoplastic Phenoxy Resin)

The resin composition may also comprise a thermoplastic phenoxy resin (d). The thermoplastic phenoxy resin is a compound represented by Formula (4)

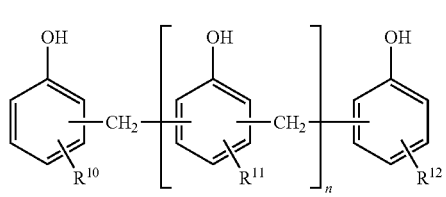

(4)

where R10, R11, and R12, which may be the same or different, stand for a hydrogen atom, an alkyl group, a cyclic acyl group, or an aryl group. The resin is also called a novolac resin. If the thermoplastic phenoxy resin (d) is compounded, the absorption of water by the polyamide resin is inhibited, the change in size of the gear for an electric power steering device caused by water absorption by the polyamide resin is decreased and, for example, the reduction of backlash with the other gear caused by water absorption and swelling and the resultant blocking of the engagement can be inhibited.

Moreover, the thermoplastic phenoxy resin (d) acts to decrease the toughness of the polyamide resin, but because this decrease can be compensated by the interaction between the above-described components (a) to (c), the gear for an electric power steering device can maintain a high rigidity and good toughness even when it contains the thermoplastic phenoxy resin. The molecular weight of the thermoplastic phenoxy resin (d) is preferably 500-1500 because in this range the resin composition can be provided with the effect of inhibiting water absorption by the polyamide resin, the melt viscosity of the resin composition can be reduced, thereby enabling the effective molding of the gear for an electric power steering device, and the effect of increasing the toughness of the gear for an electric power steering device, without reducing the elasticity thereof, that is caused by the interaction of the components (a) to (c) can be demonstrated uninhibitedly. The value of n in Formula (4) is preferably adjusted to fit the molecular weight into this range.

Furthermore, the content ratio of the thermoplastic phenoxy resin (d) in the entire resin composition is preferably 1 to 10 wt. %. If the content ratio of the thermoplastic phenoxy resin (d) is less than 1 wt. %, the sufficient effect of inhibiting the absorption of water by the polyamide resin might not be obtained. Furthermore, if the content ratio exceeds 10 wt. %, the action of decreasing the toughness of the polyamide resin that is demonstrated by the thermoplastic phenoxy resin can be intensified. As a result, this action cannot be sufficiently compensated by the interaction of the components (a) to (c) and the toughness of the gear for an electric power steering device might be decreased. In order to enhance further the effect of inhibiting the absorption of water by the polyamide resin that is produced by the thermoplastic phenoxy resin (d) and also to inhibit the decrease in the toughness of the gear for an electric power steering device, the content ratio of the thermoplastic phenoxy resin (d) in the entire resin composition is 1.5 to 8 wt. %, preferably 2 to 6 wt. % within the above-described range.

In addition to the above-described components, the resin composition may further comprise a thermal stabilizer for increasing heat resistance, and a high-density polyethylene (HDPE) powder, an ultrahigh molecular weight polyethylene (UHMWPE) powder, molybdenum disulfide, or a fluorine-containing lubricant as a solid lubricant for increasing wear resistance. Introducing those components into the resin composition makes it possible to increase further the endurance of the gear for an electric power steering device.

However, some of the additives can react preferentially with the polycarbodiimide compound, thereby impeding the interaction between the polycarbodiimide compound and the polyamide resin or elastic material. Because the expected effect of increasing the toughness cannot be obtained in such cases, it is important to use selectively such additives that do not interact with the polycarbodiimide compound.

(Reduction Gear Mechanism and Electric Power Steering Device)

Figure 2:
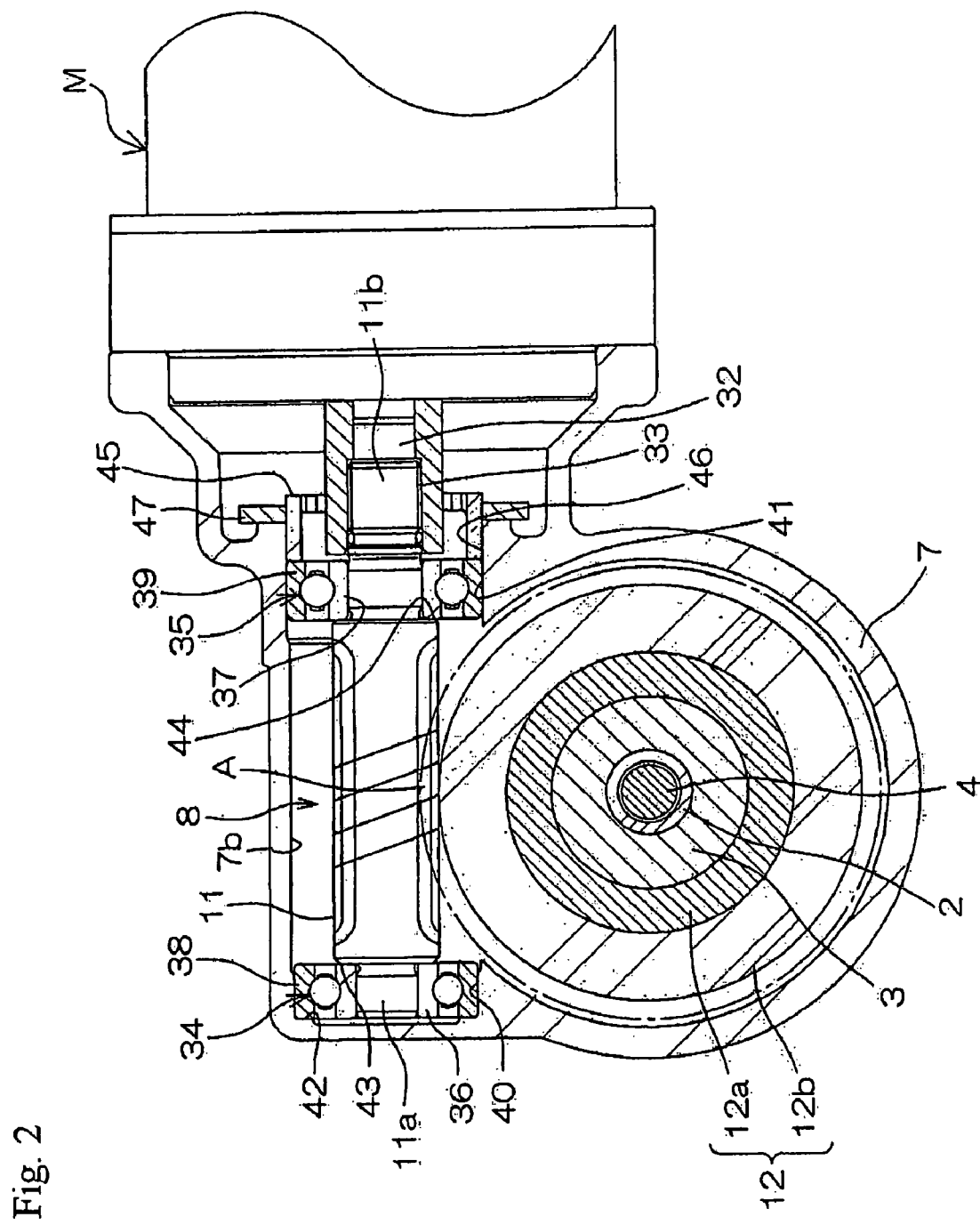
FIG. 2 is a cross-sectional view along the II-II line in FIG. 1.

FIG. 1 is a schematic cross-sectional view illustrating an example of an electric power steering device having a reduction gear mechanism incorporating the gear for an electric power steering device in accordance with the present invention. FIG. 2 is a cross-sectional view along the II-II line in FIG. 1.

Referring to FIG. 1, in the electric power steering device, a first steering shaft 2 serving an input shaft having the steering wheel 1 mounted thereon and a second steering shaft 3 serving as a power shaft linked operably to a steering mechanism (not shown in the figures) such as a rack and pinion mechanism are linked coaxially via a torsion bar 4.

A housing 5 supporting the first and second steering shafts 2, 3 is made, for example, from an aluminum alloy and mounted on a vehicle body (not shown in the figures). The housing 5 comprises a sensor housing 6 and a gear housing 7 joined together. More specifically, the gear housing 7 has a cylindrical shape, and an annular edge section 7a at the upper end thereof is joined to an annular step section 6a on the outer periphery of the lower end of the sensor housing 6. The gear housing 7 accommodates a worm gear mechanism 8 serving as a reduction mechanism, and the sensor housing 6 accommodates a torque sensor 9, a control panel 10, and the like.

The worm gear mechanism 8 comprises a worm wheel (large gear) 12 that can rotate integrally with the middle section of the second steering shaft 3 in the axial direction thereof with controlled movement in the axial direction and serves as the gear for an electric power steering device in accordance with the present invention and a worm shaft 11 (small gear, see FIG. 2) that is engaged with the worm wheel 12 and linked to a rotary shaft 32 of an electric motor M via a spline coupling 33.

The worm wheel 12 comprises an annular core 12a joined to the second steering shaft 3 to enable integral rotation therewith and a gear body 12b made from the resin composition, surrounding the outer periphery of the core 12a, and having teeth formed on the outer periphery thereof. The worm wheel 12 is formed, as described hereinabove, by joining and integrating the core 12a and the gear body 12b, for example, by insert molding.

The second steering shaft 3 is rotatably supported by first and second rolling bearings 13, 14 disposed so as to sandwich the worm wheel 12 from above and below in the axial direction.

An outer ring 15 of the first rolling bearing 13 is fitted into and retained in a bearing retaining hole 16 provided in a tubular protrusion 6b at the lower end of the sensor housing 6. The upper end surface of the outer ring 15 abuts against the annular step section 17, and the axial upward movement thereof with respect to the sensor housing 6 is inhibited.

On the other hand, an inner ring 18 of the first rolling bearing 13 is joined by external press tightening to the second steering shaft 3. The lower end surface of the inner ring 18 abuts against the upper end surface of the core 12a of the worm wheel 12.

An outer ring 19 of the second rolling bearing 14 is fitted into and retained in a bearing retaining hole 20 of the gear housing 7. The lower end surface of the outer ring 19 abuts against the annular step section 21, and the axial downward movement thereof with respect to the gear housing 7 is inhibited.

On the other hand, an inner ring 22 of the second rolling bearing 14 is mounted on the second steering shaft 3 so that it can rotate integrally therewith and so that the relative movement thereof in the axial direction is inhibited. Furthermore, the inner ring 22 is sandwiched between a step section 23 of the second steering shaft 3 and a nut 24 that is tightened on the threaded section of the second steering shaft 3.

The torsion bar 4 passes through the first and second steering shafts 2, 3. The upper end 4a of the torsion bar 4 is integrally rotatably linked to the first steering shaft 2 with a link pin 25, and the lower end 4b is integrally rotatably linked to the second steering shaft 3 with a link pin 26. The lower end of the second steering shaft 3 is linked, as described above, to a steering mechanism such as a rack and pinion mechanism via an intermediate shaft (not shown in the figure.

The link pin 25 links a third steering shaft 27, which is disposed coaxially with the first steering shaft 2, so that it can rotate integrally with the first steering shaft 2. The third steering shaft 27 passes through inside a tube 28 constituting a steering column.

The upper section of the first steering shaft 2 is rotatably supported on the sensor housing 6 via a third rolling bearing 29, for example, a needle roller bearing. A small diameter section 30 of the lower section of the first steering shaft 2 and a hole 31 of the upper section of the second steering shaft 3 are joined by providing the prescribed backlash in the rotation direction, so as to restrict the relative rotation of the first and second steering shafts 2, 3 to the prescribed range.

Further, referring to FIG. 2, the worm shaft 11 is rotatably supported by fourth and fifth rolling bearings 34, 35 that are retained by the gear housing 7.

Inner rings 36, 37 of the fourth and fifth rolling bearings 34, 35 are joined with the necking sections corresponding to the worm shaft 11. Furthermore, outer rings 38, 39 are retained in bearing retaining holes 40, 41, respectively, of the gear housing 7.

The gear housing 7 comprises a portion 7b facing, in the radial direction, part of the circumferential surface of the worm shaft 11.

Furthermore, the outer ring 38 of the fourth rolling bearing 34 supporting one end section 11a of the worm shaft 11 is aligned by abutting against a step section 42 of the gear housing 7. On the other hand, the movement of the inner ring 36 toward the other end section 11b is restricted by the abutment thereof against an aligning step section 43 of the worm shaft 11.

The movement of the inner ring 37 of the fifth rolling bearing 35, which supports a zone in the vicinity of the other end section 11b (end section on the side of coupling) of the worm shaft 11, toward the one end section 11a is restricted by the abutment thereof against an aligning step section 44 of the worm shaft 11. Furthermore, the outer ring 39 is impelled toward the fourth rolling bearing 34 by a screw member 45 for preliminary pressure adjustment. When the screw member 45 is threaded into a threaded hole 46 formed in the gear housing 7, it applies a preliminary pressure to a pair of rolling bearings 34, 35 and, at the same time, aligns the worm shaft 11 in the axial direction. The reference numeral 47 stands for a lock nut engaged with the screw member 45 in order to stop and fix the screw member 45 for preliminary pressure adjustment.

Inside the gear housing 7, the area comprising at least the engagement portion A of the worm shaft 11 and worm wheel 12 is filled with a lubricant composition. Thus, only the engagement portion A, or the engagement portion A and the entire periphery of the worm shaft 11, or the entire inner side of the gear housing 7 may be filled with the lubricant composition.

The present invention is not limited to the above-described implementation mode. For example, the gear for an electric power steering device in accordance with the present invention is not limited to the worm wheel 12 that constitutes the worm gear mechanism 8 in combination with the worm shaft 11, and the configuration of the present invention can be also employed in a variety of gears constituting a reduction gear mechanism such as flat gears, bevel gears, hypoid gears, helical gears, and rack gears, in particular in larger gears. Furthermore, various modifications can be made within the scope of features described in the claims of the invention.

EXAMPLES

Preparation of Examples 1-12 and Comparative Examples 1-6

The components shown in Tables 1-3 were melt-blended in a dual-shaft kneader, extruded, solidified, and cut into pellets. Ingredient quantities are given in weight percent based on the total weight of the composition.

Melt Viscosity Measurement

Melt viscosity was measured with a Kayness Capillary Reometer (Yasuda Seisakusho, LCR Series), using the resulting pellet samples. Measurements were performed at a melt temperature of 280° C. and a shear rate of 1,000 sec$^{-1}$ on pellets having a moisture content of 0.13±0.01%. All tests were repeated 5 times, and the results are shown as a mean value.

Preparation of Test Pieces 4.0 mm high×175 mm long×20 mm wide ISO test pieces were formed from the resulting pellets described above using normal molding conditions for non-reinforced nylon resin.

Measurement of Physical Properties

The test pieces described above were used to measure the physical properties.

Tensile elongation was measured according to ISO 527-1/-2.

Modulus of elasticity was measured according to ISO 178.

Charpy impact strength was measured according to ISO 179/1eA. Initial impact energy was set at 2 J, but impact was repeated with the impact energy further increased to 15 J for those samples that did not break. "Unbroken" in Table 2 indicates that the sample did not break under either 2 J or 15 J of impact energy.

Dimensional Stability

The compositions of Examples 7, 11, and 12 were molded into 60×60×2 mm plaques. The length of the plaques in the flow direction was measured and the plaques were conditioned at 50° C. and 95% relative humidity for 500 hours. The length of the plaques in the flow direction was then measured again and the percent change was calculated. It was 2.32% for Example 7; 1.55% for Example 11; and 1.27% for Example 12.

The following materials were used as the ingredients in the compositions of the examples and comparative examples.

Polyamide resin A (polyamide 6,6): Zytel® 101, available from DuPont.

Polyamide resin B (solid-phase polymerized polyamide 6,6): Zytele® E50, available from DuPont.

Impact modifier: EPDM rubber grafted with maleic anhydride.

Polycarbodiimide: Stabaxol P, an aromatic polycarbodiimide available from Bayer.

Phenol-formaldedhyde resin: Sumiliteresin® PR-NMD-202, a phenolic novolac resin having a softening temperature of 118° C. and available from Sumitomo Bakelite Co. Ltd.

Thermal stabilizer: Copper thermal stabilizer.

TABLE 1

|  | Comp. Ex. 1 | Comp. Ex. 2 | Comp. Ex. 3 | Comp. Ex. 4 |
|---|---|---|---|---|
| Polyamide A | 99.75 | — | 98.8 | 98.25 |
| Polyamide B | — | 99.75 | — | — |
| Thermal stabilizer | 0.25 | 0.25 | 0.25 | 0.25 |
| Polycarbodiimide | 0 | 0 | 0.95 | 1.50 |
| Impact modifier | 0 | 0 | 0 | 0 |
| Melt viscosity (Pa·s) | 137.8 | 375.7 | 274.3 | 298.5 |
| Tensile elongation (%) | 35.6 | 71.8 | 67.8 | 64.6 |
| Modulus of elasticity (MPa) | 2681 | 2800 | 2686 | 2688 |
| Charpy impact strength (KJ/m$^2$) | 4.7 | 7.5 | 5.9 | 6.9 |
| Moldability | No problem | No problem | No problem | No problem |

TABLE 2

|  | Comp. Ex. 5 | Ex. 1 | Ex. 2 | Ex. 3 | Ex. 4 |
|---|---|---|---|---|---|
| Polyamide A | 94.46 | 94.26 | 93.46 | 92.96 | 92.46 |
| Thermal stabilizer | 0.54 | 0.54 | 0.54 | 0.54 | 0.54 |
| Polycarbodiimide | 0 | 0.20 | 1.00 | 1.50 | 2.00 |
| Impact modifier | 5.0 | 5.0 | 5.0 | 5.0 | 5.0 |
| Melt viscosity (Pa·s) | 167.4 | 193.1 | 318.2 | 363 | 390.7 |
| Tensile elongation (%) | 23.6 | 27.7 | 39.1 | 56.0 | 55.2 |
| Modulus of elasticity (MPa) | 2703 | 2625 | 2535 | 2538 | 2444 |
| Charpy impact strength (KJ/m$^2$) | 9.3 | 11.7 | 13.4 | 15.9 | 18.4 |
| Moldability | No problem | No problem | No problem | No problem | No problem |

TABLE 3

|  | Comp. Ex. 6 | Ex. 5 | Ex. 6 | Ex. 7 | Ex. 8 | Ex. 9 | Ex. 10 |
|---|---|---|---|---|---|---|---|
| Polyamide A | 89.46 | 89.26 | 88.46 | 87.96 | 87.46 | 84.46 | 77.96 |
| Thermal stabilizer | 0.54 | 0.54 | 0.54 | 0.54 | 0.54 | 0.54 | 0.54 |
| Polycarbodiimide | 0 | 0.20 | 1.00 | 1.50 | 2.00 | 5.00 | 1.50 |
| Impact modifier | 10.0 | 10.0 | 10.0 | 10.0 | 10.0 | 10.0 | 20.0 |
| Melt viscosity (Pa·s) | 258.6 | 273.9 | 413.7 | 487.5 | Not melted, could not measure | Not melted, could not measure | Not melted, could not measured |
| Tensile elongation (%) | 32.9 | 41.1 | 42.9 | 84.8 | n.m. | n.m. | n.m. |
| Modulus of elasticity (MPa) | 2260 | 2242 | 2186 | 2133 | n.m. | n.m. | n.m. |
| Charpy impact strength (KJ/m$^2$) | 20.8 | 22.6 | 31.7 | Unbroken | n.m. | n.m. | n.m. |
| Moldability | No problem | No problem | No problem | No problem | Difficult to mold due to high viscosity | Difficult to mold due to high viscosity | Difficult to mold due to high viscosity | n.m. = not measurable

TABLE 4

|  | Ex. 11 | Ex. 12 |
|---|---|---|
| Polyamide A | 83.96 | 79.96 |
| Thermal stabilizer | 0.54 | 0.54 |
| Polycarbodiimide | 1.5 | 1.5 |
| Impact modifier | 10 | 10 |
| Phenol-formaldehyde resin | 4 | 8 |
| Melt viscosity (Pa · s) | 404 | 329 |
| Tensile elongation (%) | 54.5 | 33.6 |
| Modulus of elasticity (MPa) | 2209 | 2311 |
| Charpy impact strength (KJ/m$^2$) | 30.6 | 20.0 |
| Moldability | No problem | No problem |

As is clear from Examples 1-10 and Comparative Examples 1-6, polyamide compositions containing impact modifier and polycarbodiimide have increased impact strength, while maintaining high stiffness, relative to polyamide compositions that do not contain polycarbodiimide and impact modifier.

Examples 11 and 12 demonstrate that the presence of phenol-formaldehyde resin in polyamide compositions containing impact modifier and polycarbodiimide leads to compositions having good stiffness and impact strength that also have good dimensional stability when exposed to moisture.

It is therefore, apparent that there has been provided in accordance with the present invention, a polyamide resin composition and article that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

Examples 13 to 17, Comparative Examples 7, 8

Pellets of a non-reinforced type for injection molding were manufactured by preliminary mixing the components (a) to (d) at ratios shown in Tables 5 and 6, kneading in a molten state by using a twin-screw (40 mm in diameter) kneading extruder, extrusion molding into a string-like shape, and pelletizing. The resin temperature during kneading was 280 to 320° C.

(a) Polyamide resin: Polyamide 66 (Zytel® 101, manufactured by Du Pont Corp., RV=49.5)

(b) Aromatic polycarbodiimide compound: Stabaxol® P (softening point 70° C.), manufactured by Rhein Chemie Co.)

(c) Elastic material: ethylene-propylene-diene copolymer modified at carboxyl groups by grafting maleic anhydride (Du Pont Corp.)

(d) Thermoplastic phenoxy resin: Sumilite Resin® PR-NMD-202 (softening point 118° C.) manufactured by Sumitomo Bakelite Co., Ltd.

Comparative Examples 9 to 13

Non-reinforced pellets were manufactured in the same manner as in Examples 13 to 17 and Comparative Examples 7 and 8, except that the below-described polyamide resins were used individually.

(i) Standard-viscosity 66 Nylon for injection molding (Zytel® 103HS, manufactured by Du Pont Corp.)

(ii) High-viscosity 66 Nylon for extrusion molding (Zytel® 42A, manufactured by Du Pont Corp.)

(iii) Ultrahigh-impact 66 Nylon for extrusion molding (Zytel® ST801, manufactured by Du Pont Corp.)

(iv) Low-viscosity (high-cycle) 6 Nylon for injection molding (UBE Nylon 1013B, manufactured by Ube Industries Ltd.)

(v) Impact-resistant 6 Nylon for injection molding (UBE Nylon 1018I, manufactured by Ube Industries Ltd.)

[Fabrication of Test Specimens]

Test specimens with a thickness of 4.0 mm, a length of 175 mm, and a width of 20 mm were injection molded under usual molding conditions for non-reinforced Nylon resins by using pellets manufactured in examples and comparative examples. Properties of the test specimens were evaluated by conducting the following tests.

[Measurement of Tensile Fracture Strain]

The tensile fracture strain (%) of the test specimens was measured following the test method stipulated by the following ISO standards.

ISO 527-1:1993 "Plastics—Determination of tensile properties—Part 1: General Principles".

ISO 527-2:1993 "Plastics—Determination of tensile properties—Part 2: Test conditions for moulding and extrusion plastics".

[Measurement of Flexural Modulus of Elasticity]

The flexural modulus of elasticity (GPa) of the test specimens was measured following the test method stipulated by the following ISO standard.

ISO 178:2001 "Plastics—Determination of flexural properties".

[Measurement of Notched Charpy Impact Strength]

The Charpy impact strength (kJ/m2) relating to a flatwise impact of notched test specimens obtained by forming a single notch in each test specimen by cutting was measured following the test method stipulated by the following ISO standard.

ISO 179-1:2000 "Plastics—Determination of Charpy impact properties—Part 1: Non-instrumented impact test".

[Measurement of Melt Viscosity]

The melt viscosity of the test specimens was measured at a measurement temperature of 280° C. and a shear rate of 1000 s−1 by using a capillary rheometer (Kayeness Capillary Rheometer, LSR series, manufactured by Yasuda Ltd.).

Figure 3:
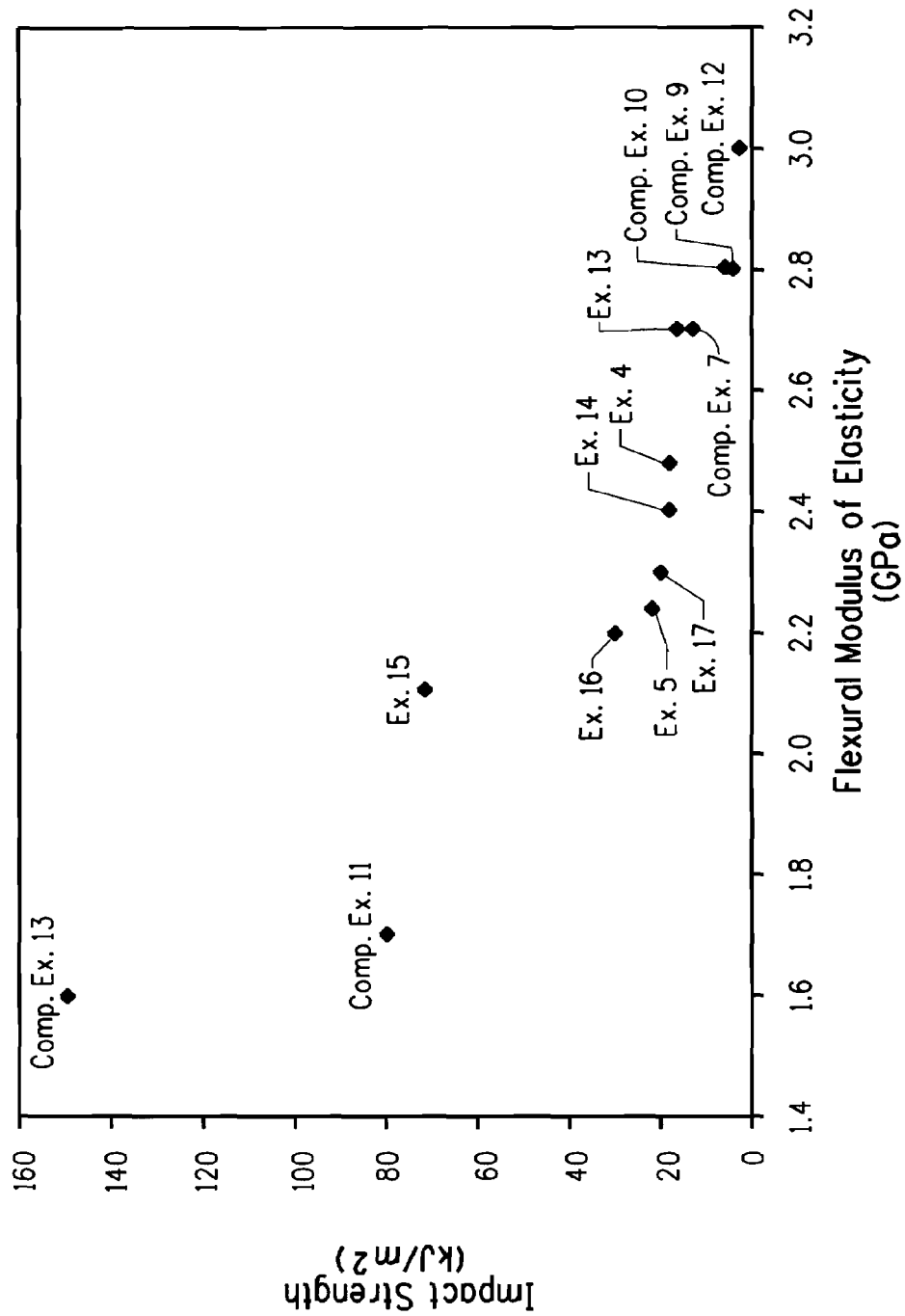
FIG. 3 is a graph illustrating the relationship between a flexural modulus of elasticity (GPa) and notched Charpy impact strength (kJ/m2) of the resin compositions for a gear of an electric power steering device fabricated in the examples of the present invention and comparative examples.

The water absorption ratio of all the test specimens used for the measurements was adjusted to 0.13%+/−0.001%. The measurements were conducted five times and the average value was found. The results are shown in Tables 5 to 7 and FIG. 3.

TABLE 5

|  |  |  | Comp. Ex. 7 | Ex. 13 | Ex. 14 | Ex. 15 |
|---|---|---|---|---|---|---|
| Parts by weight | (a) | Polyamide resin | 94.8 | 93.5 | 93 | 88.5 |
|  | (b) | Polycarbodiimide compound | 0.2 | 1.5 | 2 | 1.5 |
|  | (c) | Elastic material | 5 | 5 | 5 | 10 |
|  | (d) | Thermoplastic phenoxy resin | — | — | — | — |
| Melt viscosity (Pa · sec) |  |  | 193 | 363 | 391 | 488 |
| Tensile fracture strain (%) |  |  | 28 | 56 | 55 | 64 |
| Flexural modulus of elasticity (GPa) |  |  | 2.7 | 2.7 | 2.4 | 2.1 |
| Notched Charpy impact strength (kJ/m$^2$) |  |  | 12 | 16 | 19 | 72 |

TABLE 6

|  |  |  | Comp. Ex. 8 | Ex. 16 | Ex. 17 |
|---|---|---|---|---|---|
| Parts by weight | (a) | Polyamide resin | 78.5 | 84.5 | 80.5 |
|  | (b) | Polycarbodiimide compound | 1.5 | 1.5 | 1.5 |
|  | (c) | Elastic material | 20 | 10 | 10 |
|  | (d) | Thermoplastic phenoxy resin | — | 4 | 8 |
| Melt viscosity (Pa · sec) |  |  | 570 | 404 | 329 |
| Tensile fracture strain (%) |  |  | Measurements were impossible | 55 | 34 |
| Flexural modulus of elasticity (GPa) |  |  | Measurements were impossible | 2.2 | 2.3 |
| Notched Charpy impact strength (kJ/m$^2$) |  |  | Measurements were impossible | 31 | 20 |

TABLE 7

|  |  | Comp. Ex. 9 | Comp. Ex. 10 | Comp. Ex. 11 | Comp. Ex. 12 | Comp. Ex. 13 |
|---|---|---|---|---|---|---|
| Parts by weight | Polyamide resin (i) | 100 | — | — | — | — |
|  | Polyamide resin (ii) | — | 100 | — | — | — |
|  | Polyamide resin (iii) | — | — | 100 | — | — |
|  | Polyamide resin (iv) | — | — | — | 100 | — |
|  | Polyamide resin (v) | — | — | — | — | 100 |
| Melt viscosity (Pa · sec) |  | 140 |  |  |  |  |
| Tensile fracture strain (%) |  | 83 | 86 | 50 | 80 | 45 |
| Flexural modulus of elasticity (GPa) |  | 2.8 | 2.8 | 1.7 | 3 | 1.6 |
| Notched Charpy impact strength (kJ/m$^2$) |  | 5 | 6 | 80 | 2.7 | 150 |

Data presented in the tables and figures demonstrate that test specimens using the conventional polyamide resin and having a high flexural modulus of elasticity and excellent rigidity (Comparative Examples 9, 10, 12) had a low impact strength and a low toughness. Conversely, the test specimens with a high impact strength and excellent toughness (Comparative Examples 11 and 13) had a small flexural modulus of elasticity and a low rigidity. Furthermore, the test specimen of Comparative Example 13 made from a resin composition comprising the components (a) to (c), but containing the polycarbodiimide compound in an amount of less than 0.5 wt. % had a high flexural modulus of elasticity and an excellent rigidity, but a low impact strength and a low toughness. With the composition of Comparative Example 14 made from a resin composition comprising the components (a) to (c), but containing the elastic material an amount of more than 15 wt. %, the melt viscosity was too high and the test specimen was difficult to mold by injection molding. As a result, measurements of the tensile fracture strain, flexural modulus of elasticity and notched Charpy impact strength were abandoned.

By contrast, all the test specimens formed by using resin compositions of the examples had excellent toughness in addition to excellent rigidity, that is, they combined high rigidity with high toughness. Furthermore, the comparison of the examples confirmed that the higher was the content of the elastic material (c), the higher could be the toughness, and when the thermoplastic phenoxy resin (d) was blended, though the rigidity decreased, this decrease in rigidity could be compensated by the functions of the components (a) to (c) and the rigidity and toughness could be maintained at a level suitable for practical use.

[Measurement of Water Absorption Ratio]

Figure 4:
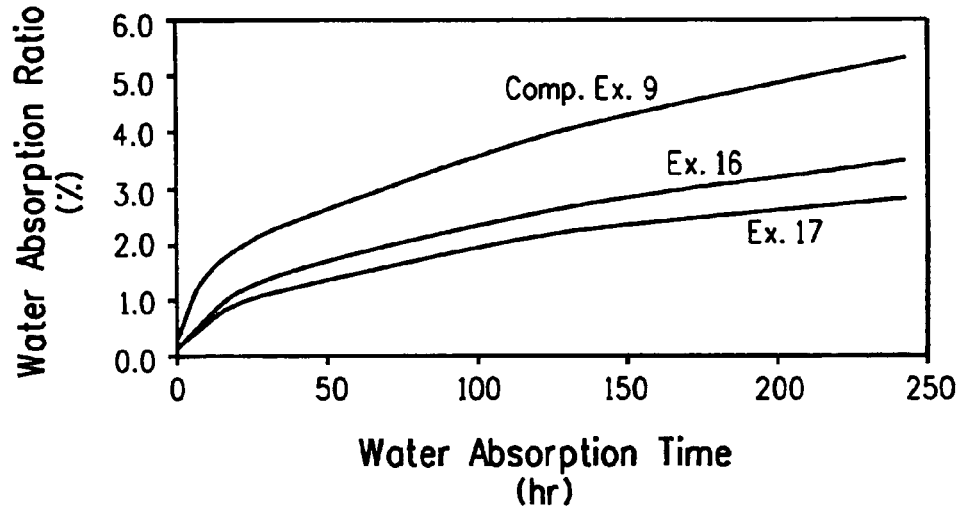
FIG. 4 is a graph illustrating the change in water absorption ratio of the resin compositions fabricated in the examples of the present invention and comparative examples.

The test specimens formed by using the resin compositions of Comparative Example 9 and Examples 16 and 17 were dried by allowing to stay for 48 h under constant temperature and humidity conditions of a temperature of 23° C. and a relative humidity of 50% RH and the weight thereof was then measured. The test specimens were then caused to absorb moisture by allowing them to stay under high-temperature and high-humidity conditions of a temperature of 50° C. and a relative humidity of 95%, and the relationship between the staying time and the water absorption ratio (%) found by the weight increase ratio with respect to that in a dry state was found. The results are shown in FIG. 4. The figure demonstrates that water absorption can be inhibited by compounding a thermoplastic phenoxy resin.

[Study of Endurance]

Figure 5:
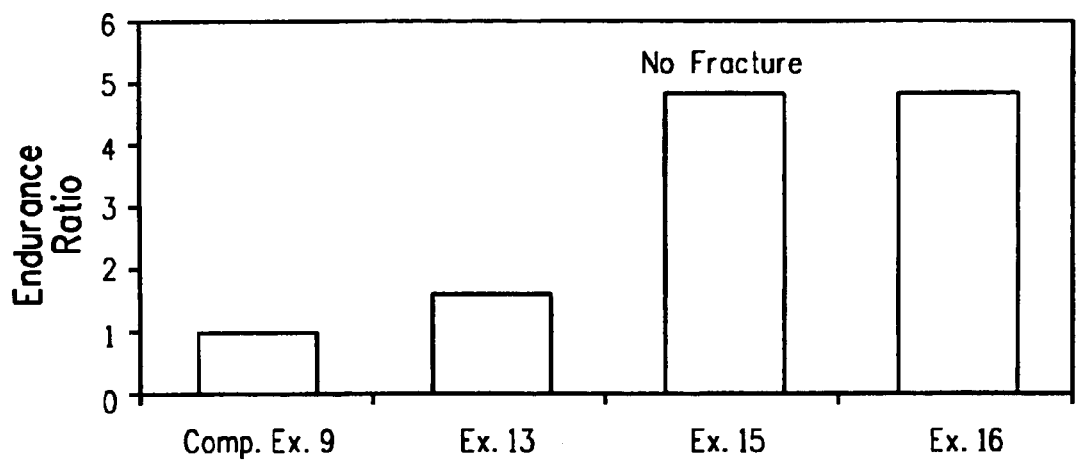
FIG. 5 is a graph illustrating the endurance ratio of the gears for an electric power steering device formed by using the resin compositions fabricated in the examples of the present invention and comparative examples.

The worm wheel 12 in which the core 12a and gear body 12b were integrated as shown in FIGS. 1 and 2 were fabricated by insert molding by using the resin compositions of Comparative Example 9 and Examples 13, 15, and 16. Each worm wheel 12 was assembled with a steel worm shaft 11 in an electric power steering device shown in FIGS. 1 and 2. The number of cycles till the gear body 12b was fractured during direct and reverse rotation under a load equivalent to a stationary steering mode of front wheels of an automobile was measured, and the ratio of the number of cycles obtained when the result of Comparative Example 7 was taken as 1 was found as an endurance ratio. The results are shown in FIG. 5. This figure demonstrates that with all the examples the endurance was increased by comparison with that of Comparative Example 7. In particular, in Example 15, the measurement were conducted to a number of cycles five times that of the endurance of Comparative Example 7, but the gear body 12b was not fractured and high endurance could be confirmed.

What is claimed is:

1. A gear having flexural modulus of elasticity of between 2100 MPa and 2700 MPa and formed from a resin composition of a non-reinforced type comprising
   (a) a polyamide resin having a carboxyl group at least at a terminal end,
   (b) 0.5-2 wt. % a polycarbodiimide compound, and
   (c) 3-15 wt. % an elastic material modified with a reactive functional group.

2. The gear for an electric power steering device according to claim 1, wherein the resin composition further comprises
   (d) 1-10 wt. % a thermoplastic phenoxy resin.

3. The gear for an electric power steering device according to claim 1, wherein the reactive functional group of the elastic material (c) is of at least one type selected from a carboxyl group and a carboxylate group.

4. The gear for an electric power steering device according to claim 1, wherein the elastic material (c) is an ethylene-propylene-diene copolymer.

* * * * *